United States Patent Office 3,574,195
Patented Apr. 6, 1971

3,574,195
1,3-DIPHENYL-PYRAZOLINES
Manfred Hajek, Leverkusen, Germany, assignor to Farbenfabriken Bayer Aktiengesellschaft, Leverkusen, Germany
No Drawing. Filed Jan. 22, 1969, Ser. No. 793,183
Claims priority, application Germany, Jan. 31, 1968, P 16 70 980.1
Int. Cl. C07c *117/00;* C07d *49/10;* C09k *1/00*
U.S. Cl. 260—239.9
2 Claims

ABSTRACT OF THE DISCLOSURE 1,3-diphenyl-pyrazoline of the formula

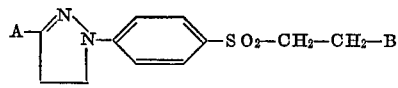

and its quaternization product of the formula

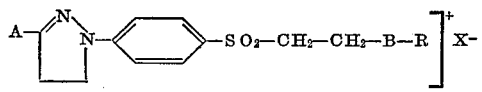

wherein A is a phenyl radical which may be substituted by halogen, alkyl, or alkoxy; B is the radical of a 5-membered nitrogen-containing ring which may be substituted by alkyl, alkoxy, or alkoxy-alkoxy; R is hydrogen, alkyl or aralkyl which may be further substituted by alkyl, alkoxy, or halogen; and X⁻ is a colorless anion. The compounds of this invention are fluorescent and useful as brightening materials or fibers, filaments, films, and the like.

---

The object of the present invention relates to new fluorescent 1,3-diphenyl-pyrazolines of the general formula

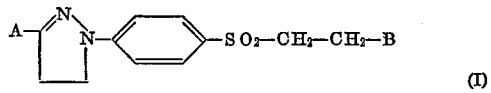

and also to their protonation or quaternisation products of the formula

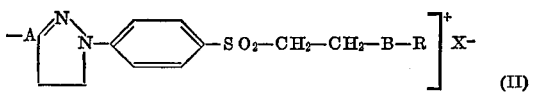

as well as to their use as brightening agents and to a process for their production.

In the Formulae I and II, A stands for an optionally substituted phenyl radical, B stands for the radical of an optionally substituted five-membered, quasi-aromatic ring linked via nitrogen, which contains 1–4 endocyclic nitrogen atoms and which may also be a constituent of a condensed system; R represents a hydrogen atom or an optionally substituted alkyl or aralkyl radical; X⁻ is a colourless anion, and the radical R is attached to nitrogen.

Suitable radicals A are phenyl radicals which may contain one or more substituents, for example, halogen, such as F, Cl or Br; alkyl groups, especially those which contain 1–4 carbon atoms and may carry further substituents; alkoxy groups, particularly those containing 1–4 carbon atoms.

Suitable radicals A of this type are, for example, phenyl, methylphenyl, ethylphenyl, butylphenyl, methoxyphenyl, butoxyphenyl, chlorophenyl, 3,4-dichlorophenyl or bromophenyl radicals.

Radicals B to be mentioned are, in particular, pyrrolyl, imidazolyl, pyrazolyl, 1,2,3-triazolyl, 1,2,4-triazolyl, tetrazolyl, benzimidazolyl or benzotriazolyl radicals which may contain substituents, for example, halogen atoms, such as Cl and Br; optionally further substituted alkyl groups, especially those with 1–4 carbon atoms; alkoxy groups, especially those with 1–4 carbon atoms, which may contain further substituents, e.g. alkoxy groups.

Suitable radicals B of this type are the following, for example, pyrazolyl-(1), 4-methylpyrazolyl-(1), 3,5-dimethylpyrazolyl-(1), 4-methoxypyrazolyl-(1), 4-methoxyethoxypyrazolyl-(1), imidazolyl-(1), 2-methylimidazolyl-(1), benzimidazolyl-(1), 1,2,3-triazolyl-(1), benzotriazolyl-(1), 1,2,4-triazolyl-(1), 3,5-dimethyl-1,2,4-triazolyl-(1) and 1,2,3,4-tetrazolyl-(1) radicals.

Suitable alkyl radicals R are, for example, methyl, ethyl or butyl radicals.

Suitable aralkyl radicals are especially benzyl radicals which may contain substituents, such as alkyl groups with 1–4 carbon atoms, or alkoxy groups with 1–4 carbon atoms, or halogen atoms, for example, Cl or Br; for example, benzyl, methyl benzyl, ethyl benzyl, butyl benzyl, methoxy benzyl, butoxy benzyl, chlorobenzyl or bromobenzyl radicals.

Anions are, for example, Cl⁻, Br⁻; monoalkyl-sulphone radicals, such as $CH_3OSO_3^-$; $C_2H_5OSO_3^-$; sulphonate groups, such as p-toluene sulphonate, benzene sulphonate, $Br_4^-$, phosphate, acetate, perchlorate, sulphate and oxalate radicals.

Suitable compounds of the Formula I are, for example, those corresponding to the formula

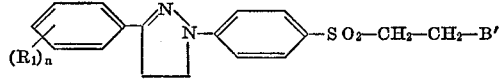

in which $R_1$ stands for indentical or different radicals, for example, for halogen, for alkyl or alkoxy radicals, n represents the numbers 0–3, and B′ stands for pyrazolyl-(1), imidazolyl-(1), benzimidazolyl, 1,2,3-triazolyl-(1), benzotriazolyl, 1,2,4-triazolyl-(1) or 1,2,3,4-tetrazolyl radicals which may be substituted by alkyl, alkoxyalkyl or alkoxy groups, as well as their quaternisation products of the formula

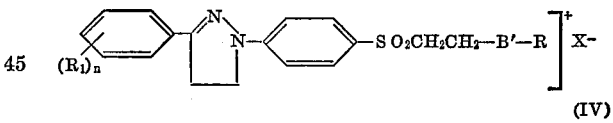

in which $R_1$, B′ and n have the same meaning as above, R stands for an optionally substituted alkyl or aralkyl radical, and X⁻ is a colourless anion.

Preferred compounds of this series are those corresponding to the formulae

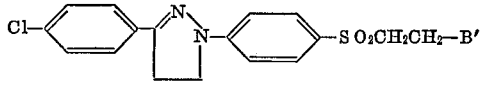

or

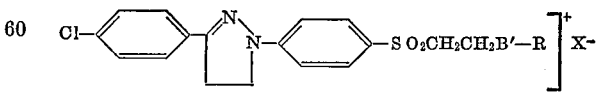

in which B′, R and X⁻ have the same meaning as above.

The compounds of the Formula I can be obtained by various methods. Thus, for example, they can be obtained in a simple manner by reacting vinyl sulphones of the formula

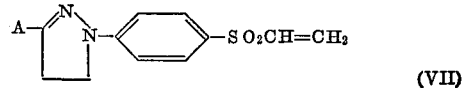

or compounds of the formula

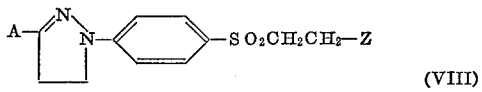

in which A has the same meaning as above, Z stands for halogen, especially chlorine or bromine, or for the radical —OSO$_2$R$_2$ wherein R$_2$ represents an optionally substituted alkyl or aryl radical, for example, a methyl, ethyl, phenyl or tolyl radical, with optionally substituted azoles BH at temperatures of about 80–150° C. The reaction may optionally be carried out in the presence of inert organic solvents, for example, dimethyl formamide, dimethyl sulphoxide, benzene, chlorobenzene or o-dichlorobenzene, and of basic catalysts, such as sodium methylate, potassium hydrazide and potassium carbonate.

Suitable azoles BH are, for example, pyrroles, imidazoles, pyrazoles, 1,2,3-triazoles, 1,2,4-triazoles, tetrazoles which may be substituted by substituents, such as halogen atoms, alkyl or alkoxy radicals, as well as condensed systems containing hetero rings of said type, for example, benzimidazole and benzotriazoles.

The following azoles may be mentioned by way of example: pyrazole, 4 - methyl-pyrazole, 3,5 - dimethyl-pyrazole, 4-methoxy-pyrazole, 4-methoxyethoxypyrazole, imidazole, 2 - methylimidazole, benzimidazole, 1,2,3-triazole, benzotriazole, 1,2,4-triazole, 3,5-dimethyl-1,2,4-triazole, 1,2,3,4-tetrazole.

Suitable vinyl sulphones of the Formula VII are especially those in which A stands for a 4'-chlorophenyl, phenyl or 3,4-dichlorophenyl radical.

Suitable compounds of the Formula VIII are especially those in which A has the same meaning as above, and R$_2$ stands for a methyl, ethyl, phenyl or tolyl radical.

A variant of the afore-mentioned process consists in using, instead of the vinyl sulphones of the Formula VII, their preliminary products of the formula

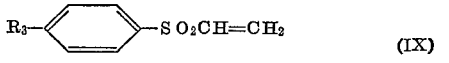

or

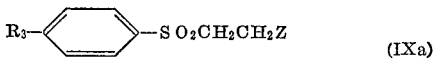

in which R$_3$ stands for a radical capable of being converted into a hydrazine group, for example, a nitro, halogen or acylamino group, and Z has the same meaning as above, and, after the reaction with the azoles BH, converting the resultant compounds of the formula

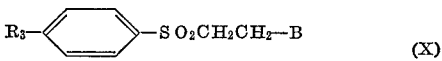

in known manner first into the hydrazine derivatives of the formula

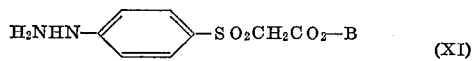

and then transforming these in known manner, for example, by the reaction with β-haloethyl phenyl ketones of the formula A—CO—CH$_2$CH$_2$Hal  (XII)

in which A has the same meaning as above and Hal stands for a halogen atom, in an aqeuous, organic-aqueous or organic medium, in the presence of a base, into the compounds of the Formula I.

The hydrazine derivatives of the Formula XI can also be obtained by reacting N-β-haloethyl-azoles of the formula HalCH$_2$CH$_2$—B  (XIII)

or compounds of the formula

R$_2$SO$_2$—O—CH$_2$CH$_2$—B  (XIIIa)

in which B stands for an azolyl radical linked via nitrogen, Hal stands for halogen, and R$_2$ has the same meaning as above, with sulphinic acids of the formula

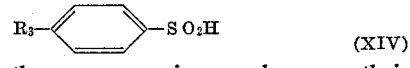

in which R$_3$ has the same meaning as above, or their salts to give the sulphones X, and subsequently transforming the substituent R$_3$ into the hydrazine group.

A variant of this process consists in reacting the compounds of the Formula XIII or XIIIa with thiophenols of the formula

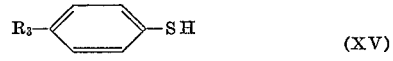

or their salts to give thioethers of the formula

and subsequently oxidising the latter to give the sulphones (X). Another process for the production of the thioethers (XVI) consists in reacting halobenzene derivatives of the formula

in which R$_3$ has the same meaning as above, and Hal stands for halogen, especially chlorine and bromine, with β-mercaptoethyl-azoles of the formula

HS—CH$_2$CH$_2$—B   (XVIII)

Compounds of the Formula I can also be obtained by reacting sulphinic acids of the formula

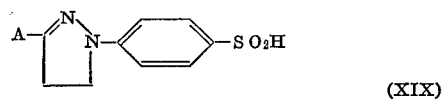

or their salts, especially the alkali metal salts, with β-halo-ethyl-azoles of the Formula XIII or with the compounds of the Formula XIIIa.

The compounds of the general Formula II are obtained by reacting compounds of the Formula I with acids or quaternising agents, for example, in an inert organic solvent. Suitable alkylation agents are, for example, the esters of strong mineral acids and organic sulphonic acids with, preferably, lower alcohols, such as alkyl chlorides, alkyl bromides, aralkyl halides, dialkyl sulphates and esters of sulphonic acids of the benzene series, such as the methyl or ethyl esters of benzene-sulphonic acid, of p-methylbenzene-sulphonic acid and p-chlorobenzene-sulphonic acid.

Suitable acids are, for example, sulphuric acid, perchloric acid, phosphoric acid and oxalic acid.

The fluorescent compounds of the Formulae I and II are suitable for brightening materials of the greatest variety, particularly for the brightening of fibres, filaments, woven and knitted fabrics, foils or plastic compositions of synthetic origin, e.g. for brightening materials of cellulose esters, polyamides, polyurethanes and polyacrylonitrile.

The brightening agents according to the present invention can be used in customary manner, for example, in the form of solutions in water or organic solvents, or in the form of aqueous dispersions. The brightening agents can also be added to casting and spinning compositions which serve for the manufacture of synthetic fibres, filaments, foils and other products. The necessary amounts can readily be determined for each case; in general, amounts ranging from 0.1 to 0.5% referred to the material to be brightened, are sufficient.

The brightening agents according to the invention give very good yields.

The degrees given in the examples are degrees centigrade.

EXAMPLE 1

5 g. of a fabric of polyacrylonitrile are introduced into 200 ml. of a bath which contains 0.01 g. of the compound of the formula

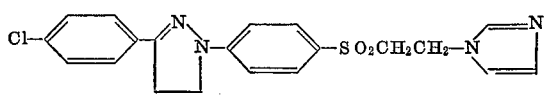

and 4 ml. formic acid; the bath is heated to boiling within 20 minutes and the fabric treated at boiling temperature for a further 30 minutes. The fabric is subsequently rinsed and dried. The fabric treated in this way exhibits an intense brightening effect of an agreeable white tint of good fastness to light.

The brightener was prepared as follows: 17.3 g. 1-(p-vinyl - sulphonyl - phenyl) - 3 - (p - chlorophenyl)-pyrazoline are heated at 30° for 6 hours with 10 g. imidazole in 50 ml. dimethyl formamide. After removal of the volatile components, the residue is redissolved from n-butanol. A pale yellow product of melting point 20B-209° is obtained.

The compounds set out in the following table have the same brightening effect and are obtained in an analogous manner from 1 - (p - vinyl - sulphonyl - phenyl)-3-(p-chlorophenyl)-pyrazoline and the appropriate azoles.

TABLE I

Compounds of the formula

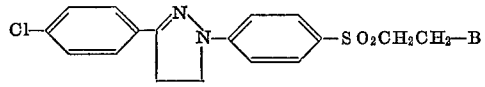

| Number | B | Melting point, °C. |
|---|---|---|
| 1 | —N(N=) (pyrazole) | 165–167 |
| 2 | —N(N=)-CH₃ | 154–158 |
| 3 | —N(N=)(CH₃)-CH₃ | 159–160 |
| 4 | —N(N=)-OCH₃ | 180–182 |
| 5 | —N(N=)-O(CH₂)₂-OCH₃ | 105–108 |
| 6 | —N(=N) (imidazole) | 208 |
| 7 | —N(=N)-H₃C | 165–166 |
| 8 | —N(=N)-benzimidazole | 222–224 |
| 9 | —N(N=N) (triazole) | 180–182 |
| 10 | —N(N=N)-benzotriazole | 214–217 |
| 11 | —N(=N)(=N) (1,2,4-triazole) | 166–167 |
| 12 | —N(N=)(CH₃)(=N)-CH₃ | — |
| 13 | —N(N=)(=N) | — |

EXAMPLE 2

The compound described in Example 1 and corresponding to the formula

can also be prepared by the following method:

A mixture of 7 g. imidazole and 22.1 g. of the sulphonic acid ester of the formula

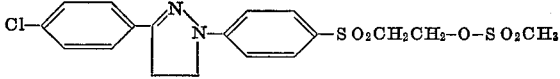

is heated at 100–110° for 2 hours. After cooling, the reaction mixture is introduced into water and the crude product redissolved from n-butanol. The pale yellow product has a melting point of 208–209°.

The sulphonic acid ester used as starting product is obtained by reacting 1 - (β - hydroxyethyl-sulphonyl-phenyl) - 3 - (p - chlorophenyl) - pyrazoline with methane sulphochloride in pyridine according to known methods. With the use of benzene-sulphochloride or p-toluene-sulphochloride, there are obtained in an analogous manner the esters included in the following table, which are also suitable as starting products for the production of the compounds described in Example 1.

TABLE II

Compounds of the formula

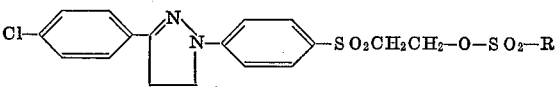

| Number | R | Melting point, °C. |
|---|---|---|
| 1 | CH₃— | 190–191 |
| 2 | —C₆H₅ | 180–182 |
| 3 | H₃C—C₆H₄— | 186–189 |

The compounds set out in Table I can be obtained in an analogous manner by reacting the sulphonic acid esters of Table II with the appropriate heterocycles.

EXAMPLE 3

A fabric of polyacrylonitrile is treated according to the method described in Example 1 with 0.01 g. of the compound of the formula

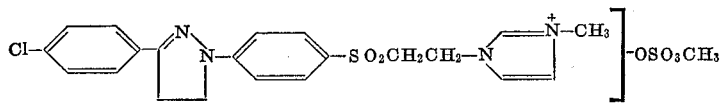

An excellent brightening effect of good fastness to light is obtained.

The compound was obtained by quaternising 41.4 g. of the compound described in Example 1 with 14.3 g. dimethyl sulphate in chlorobenzene at 80–85°. The same results are obtained with the use of the brightening agents obtained by analogous quaternisation of the compounds Nos. 1–13 of the table of Example 1.

Further suitable compounds are set out in the following table:

TABLE III

Compounds of the formula:

Cl—⟨phenyl⟩—pyrazoline—⟨phenyl⟩—SO₂CH₂CH₂—B⁺  ⁻OSO₃CH₃

| Number: | B⁺ | Melting point, °C. |
|---|---|---|
| 1 | —N⟨pyridinium⟩—CH₃ | |
| 2 | —N⟨imidazolium⟩⁺—CH₃ | 182–184 |
| 3 | —N⟨H₃C-imidazolium⟩⁺—CH₃ | 205–210 |
| 4 | —N⟨triazolium N=N⟩⁺—CH₃ | ¹ 145–148 |
| 5 | —N⟨triazolium⟩—N⁺—CH₃ | ¹ >180 |
| 6 | —N⟨CH₃-imidazolium-CH₃⟩⁺—CH₃ | |

¹ Decomposition.

EXAMPLE 4

5 g. cellulose acetate fibres are introduced into 150 ml. of an aqueous bath containing 0.005 g. of the compound

The bath is slowly heated to 60°. This temperature is maintained for a further 30 minutes, the material is then rinsed and dried. The fibres thus treated have a brightening effect of an intensive violet tint.

The brightener was obtained according to the following process:

17.3 g. 1 - (p - vinyl-sulphonyl-phenyl)-3-(p-chlorophenyl)-pyrazoline are heated at 140–150° for 15 hours in 40 parts 1,2,3-triazole in the presence of 0.1 part sodium methylate. The reaction product is isolated from the cold reaction mixture by suction filtration. After redissolution from n-butanol, pale yellow crystals of melting point 180–182° are obtained.

I claim:

1. 1,3-diphenyl-pyrazoline of the formula

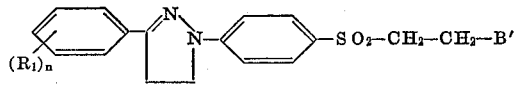

or a quaternization product thereof of the formula

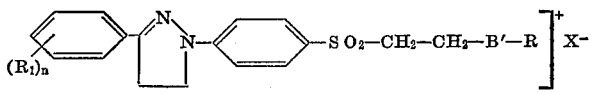

wherein $R_1$ is a radical selected from the group consisting of fluorine, chlorine, bromine, alkyl of 1–4 carbon atoms, and alkoxy of 1–4 carbon atoms; $n$ is a number from 0 to 3; and B' is selected from the group consisting of pyrazolyl-(1), imidazolyl-(1), benzimidazolyl-(1), 1,2,3-triazolyl-(1), benzotriazolyl, 1,2,4-triazolyl-(1), 1,2,3,4-tetrazolyl, and such radicals substituted by a member of the group consisting of alkyl of 1–4 carbon atoms, alkoxyalkoxy of 2–8 carbon atoms, and alkoxy of 1–4 carbon atoms; R is alkyl of 1–4 carbon atoms, benzyl, or said alkyl or benzyl substituted by a member of the group consisting of alkyl of 1–4 carbon atoms, alkoxy of 1–4 carbon atoms, chlorine, and bromine; and $X^-$ is a colorless anion.

2. 1,3-diphenyl-pyrazoline of the formula

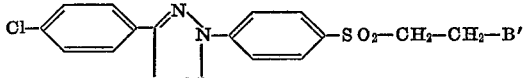

or a quaternization product thereof of the formula

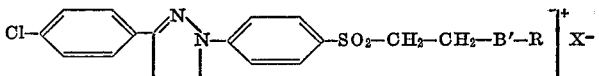

wherein B' is selected from the group consisting of pyrazolyl-(1), benzotriazolyl, imidazolyl-(1), 1,2,3,-triazolyl, 1,2,4-triazolyl-(1), 1,2,3,4 - tetrazolyl, and such radicals substituted by a member of the group consisting of alkyl of 1–4 carbon atoms, alkoxyalkoxy of 2–8 carbon atoms, and alkoxy of 1–4 carbon atoms; R is alkyl of 1–4 carbon atoms, benzyl, or said alkyl or benzyl substituted by a member of the group consisting of alkyl of 1–4 carbon atoms, alkoxy of 1–4 carbon atoms, chlorine, and bromine; and $X^-$ is a colorless anion.

References Cited

UNITED STATES PATENTS

3,406,163  10/1968  Meininger et al. _____ 260—162

FOREIGN PATENTS

1,431,233  1/1966  France _____ 260—239.9

OTHER REFERENCES

Smith: Open-Chain N-Cpds I (Benjamin, N.Y., 1965), pp. 23–24.

HENRY R. GILES, Primary Examiner

C. M. SHURKO, Assistant Examiner

U.S. Cl. X.R.

117—33.5; 252—301.2; 260—308, 309, 309.2, 310

UNITED STATES PATENT OFFICE
CERTIFICATE OF CORRECTION

Patent No. 3,574,195      Dated April 6, 1971

Inventor(s) Manfred Hajek,

It is certified that error appears in the above-identified patent and that said Letters Patent are hereby corrected as shown below:

| COLUMN | LINE | ERROR |
|---|---|---|
| 1 | 4th formula | "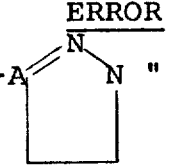" should be 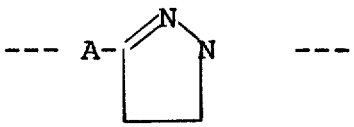 |
| 2 | 25 | "Br$_4$" should be ---BF$_4$--- |
| 3 | 22 | "benzemidazole" should be ---benzimidazoles--- |
| 3 | 57 formula | "H$_2$NHN-⟨ ⟩-SO$_2$CH$_2$CO$_2$-B" should be ---H$_2$NHN-⟨ ⟩-SO$_2$CH$_2$CH$_2$-B--- |
| 5 | 25 | "20B-209°" should be ---208-209 |
| 7 | 26 | "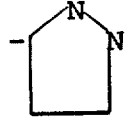" should be ---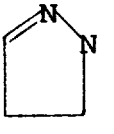 |

Signed and sealed this 9th day of November 1971.

(SEAL)
Attest:

EDWARD M. FLETCHER, JR.
Attesting Officer

ROBERT GOTTSCHALK
Acting Commissioner of P